Patented Apr. 17, 1928.

1,666,663

UNITED STATES PATENT OFFICE.

THEODORE NAGEL, OF BROOKLYN, NEW YORK.

FUEL MATERIAL.

No Drawing.   Application filed October 31, 1924.   Serial No. 747,048.

This invention relates to binders, more particularly to a binding fuel material for fuel and other briquets and agglomerates.

In my Patent No. 1,507,673, dated September 9, 1924, for agglomerated finely-divided material and method of producing the same, I have described a new binding fuel material including phosphoric acid or similar substance and an organic material, such as blackstrap molasses in water. Briquets for fuel purposes made with this binder and subsequently baked have many desirable characteristics which render the same far superior to briquets made with the binders of the prior art. They are tough in the raw state and, after baking, are hard, water-insoluble, do not disintegrate while burning, and are smokeless. Various phases of this invention are set forth in my Patents Nos. 1,507,674, 1,507,675, 1,507,676, 1,507,677, 1,507,678 and 1,507,679, and also in several pending applications.

I have discovered that some of the materials described and claimed in the said patents and applications are not readily available or are not sufficiently widely distributed for use in many localities. For instance, the supply of available blackstrap molasses is limited because of a widespread and increasing use of the same in the fermentation industries. Alcohol slops is concentrated to the desired degree in but a few localities necessitating the expense of shipping the same to the points of use. Sulphite liquor alone as a binder has many disadvantages, resulting in briquets which are fragile in the raw state, are hard to carbonize and give off sulphurous odors. Because of the shortage of these materials or the disadvantages thereof I conducted a series of experiments in an attempt to find a material which is produced in practically all localities, is relatively cheap, the supply of which is large and is obtainable at all times.

I found that if I treated a starchy substance so as to dextrinize the same, in whole or in part, a mixture thereof with an acid phosphatic compound, such as ordinary phosphoric acid, provided an excellent binding material for briquets. I generally use a waste starchy material which is low in cost, such as flour mill sweepings, low grade flour (Red Dog), spoiled grain or other starch containing substances. I may use pure starch but this is undesirable because of the relatively high cost thereof without any attendant advantages. In fact I have found that crude materials, such as mill sweepings and low grade flours, which contain non-carbohydrate substances, are usually preferable to pure starch in that they make a better binder, possibly because the substances other than starch contained therein produce better binding qualities than pure starch.

The dextrinization of the material may be accomplished in a variety of ways, such as by heating with an acid or an alkali, with or without the application of pressure, or by heating in the presence of steam or in any other well-known manner. But for the purpose of my invention it is unnecessary to dextrinize the starchy substance before mixing with phosphoric acid, and I usually mix the two ingredients and heat the mixture to cause the phosphoric acid thereof to hydrolize or dextrinize the starch. Such a procedure avoids an additional step and greatly simplifies the process.

In practicing my invention I may take one part by weight of flour mill sweepings and add thereto one part by weight of water in the cold and thoroughly and uniformly mix the same. One part by weight of crude, dilute phosphoric acid solution containing about 20% $P_2O_5$ is then added to the mixture, after which it is heated to boiling in a heated mixer, preferably until it is thoroughly dextrinized. For example, finely divided anthracite coal, preferably treated to decrease the ash content thereof, is mixed with approximately 10% by weight of the dextrinized starch-phosphoric acid binder and is briquetted and then baked at about 300° C. until heated throughout to produce an exceptionally hard, smokeless, water-insoluble briquet.

It will be noted that my binder includes but two ingredients, in addition to water, both of which are readily available in many localities at stable prices. Phosphoric acid is made from calcium phosphate rock by several processes in large quantities. The distribution of the rock is wide and the cost thereof is low assuring an adequate supply of the acid. Starchy materials, such as flour, are of course staple products which are grown and manufactured over the entire country and are available at all seasons of the year. Therefore, my new binder may be economically used for briquetting in all parts of the country because of the availability of the ingredients without expensive shipping thereof from great distances and because of the low cost thereof. The briquets made with this binder have qualities superior to those made with binders of the prior art and are the equal in all desirable characteristics, such as water-insolubility, toughness, smokelessness and non-disintegration in burning, of briquets made in accordance with the subject matter of my patents and pending applications above referred to.

My invention is not limited to the proportions of the ingredients of my binder given above since they may be varied within a wide range with good results. I may use a stronger or weaker phosphoric acid solution than one containing 20% $P_2O_5$ and correspondingly vary the amount of water added to the starch. Instead of adding water to the starch and then mixing phosphoric acid therewith, I may use a weak phosphoric acid solution and mix the starch directly with the acid. The starch paste may be heated before the addition of the phosphoric acid but preferably it is mixed cold to prevent the formation of clots. In making briquets with my new binder I am not limited to anthracite coal since other finely divided materials, such as coke, semi-coke, bituminous coal and other substances, may be substituted therefor.

Although in the example given above, I have used 10% of the binder, a smaller or larger amount may be used with good results. For instance, I have found that 8% of binder results in a good briquet, 6% gives a briquet that is sufficiently strong for ordinary use, and as much as 15% or even more may be used, but in general it is unnecessary to use more binder than is required to wet substantially all the particles to be briquetted. The larger amounts of binder increase the cost of the finished briquets to a degree usually not commensurate with the better results obtained by the use thereof. In the example of my binder set forth above the water content is about 60% but I am not limited thereto as more or less water may be used therein. It is generally not feasible to greatly decrease the amount of water used because the binder has a tendency then to become viscous, but the binder may be diluted with water to a great degree without impairing its adhesiveness. However, I prefer to use a fairly concentrated binder as it requires less time for the baking of the briquets because there is less water to be evaporated.

The temperature of baking may be increased up to 400° C. or even higher, with a corresponding reduction in the time, or it may be lowered with an increase in the time of baking. These and other changes may be made in my invention, the scope of which is set forth in the claims appended hereto.

What I claim is:

1. A binding fuel material for briquets comprising a mixture of an acid phosphatic compound and a starchy substance.

2. A binding fuel material for briquets comprising a mixture of an acid phosphatic compound and a starch.

3. A binding fuel material for briquets comprising a mixture of an acid phosphatic compound and a flour.

4. A binding fuel material for briquets comprising a mixture of an acid phosphatic compound and a starchy substance containing non-carbohydrates.

5. A binding fuel material for briquets comprising a mixture of an acid phosphatic compound and a dextrinized, starchy substance.

6. A binding fuel material for briquets comprising a mixture of one part of starchy substance and one part of phosphoric acid solution containing about 20% $P_2O_5$.

7. A binding fuel material for briquets comprising a mixture of one part of starchy substance, one part of phosphoric acid solution containing about 20% $P_2O_5$ and one part of water.

8. A method of making a binding fuel material which comprises providing a mixture containing phosphoric acid and starch in water and dextrinizing the same.

9. A method of briquetting which comprises providing a binding fuel material of dextrinized starch and phosphoric acid, mixing substantially not more than 15% by weight thereof with finely divided fuel, forming briquets therefrom and baking the same at a temperature not over 400° C. until the binder becomes hard and water insoluble.

10. A method of briquetting which comprises providing a binding fuel material of dextrinized starch, phosphoric acid and water, mixing substantially not more than 15% by weight thereof with finely divided fuel, forming briquets therefrom and baking the same at a temperature not over 400° C. until the binder becomes hard and water insoluble.

11. A method of briquetting which comprises providing a binding fuel material of dextrinized starch and phosphoric acid, mixing about 6% to 15% by weight thereof with finely divided fuel, forming briquets therefrom and baking the same at a temperature not over 400° C. until the binder becomes hard and water insoluble.

12. A method of briquetting which comprises providing a binding fuel material of dextrinized starch and phosphoric acid, mixing the same with finely divided fuel, the amount of binder being sufficient to wet substantially all the particles of fuel; forming briquets therefrom and baking the same until the binder becomes hard and water insoluble.

13. A method of briquetting which comprises providing a binding fuel material of substantially equal parts by weight of a starchy substance, water and phosphoric acid solution containing about 20% $P_2O_5$, mixing about 10% thereof with finely divided fuel, forming briquets therefrom and baking the same at about 300° C. until the binder becomes hard and water insoluble.

In testimony whereof, I have hereunto subscribed my name this 22nd day of October, 1924.

THEODORE NAGEL.